United States Patent

[11] 3,553,468

[72] Inventor Michael John Dench
Bedford, England
[21] Appl. No. 713,342
[22] Filed Mar. 15, 1968
[45] Patented Jan. 5, 1971
[73] Assignee George Richards & Company Limited
[32] Priority Mar. 15, 1967
[33] Great Britain
[31] No. 12093/67

[54] READING HEAD FOR DETECTING A MODULATED IMAGE
9 Claims, 3 Drawing Figs.
[52] U.S. Cl. .................................................. 250/230,
250/237, 250/239
[51] Int. Cl. ..................................................... G01d 5/30,
H01j 3/16, H01j 5/16

[50] Field of Search............................................ 250/232,
204; 356/169, 170; 250/230, 239, 217, 219

[56] References Cited
UNITED STATES PATENTS
2,948,890  8/1960  Barth et al. .................... 356/170X
3,122,686  2/1964  Davies et al. .................. 356/169X Primary Examiner—James W. Lawrence
Assistant Examiner—V. Lafranchi
Attorney—Holcombe, Wetherill and Brisebois ABSTRACT: This invention is a reading head having a number of photo cells for cooperating with an optical grating to give a position signal. Light for illuminating the grating is also used to illuminate a part of the cells displaced from the part where the grating image appears for setting up the cells in the position of minimum illumination.

INVENTOR
MICHAEL J. DENCH
BY
Holcombe, Wetherill & Brisebois
ATTORNEYS

READING HEAD FOR DETECTING A MODULATED IMAGE

This invention relates to a reading head for determining a positional relationship with an optical grating for example a reading head of the kind described in U.S. Pat. Specification No. 3,122,686 in which the relationship between a cursor carried on the reading head on a saddle or other movable part of a machine tool and a ruled grating carried by the machine tool is used to give an electrical signal for controlling the machine tool.

In general such reading heads operate by use of a number of photosensitive detectors each arranged to receive light from a different section of grating and electrical means for determining from the instantaneous outputs from the various detectors a positional signal.

In the past a balancing adjustment has been obtained by means of an adjustable light stop associated with each photosensitive detector for ensuring that the maximum illumination of all detectors is the same.

According to the present invention an adjustment arrangement for the detectors comprises a source of light in the head arranged to illuminate a part of the sensitive surface of each detector displaced from the part where the image modulated by the grating appears, and an individual adjuster for each detector of the light falling on the displaced part of the sensitive surface.

In a preferred form of the invention the source of light is constituted by a reflecting surface arranged to reflect on to the displaced parts of the sensitive surfaces of the detectors, a strip of light from a lamp which is also used to illuminate the grating.

Where the head includes a cursor defining the apertures between each sensitive detector and a part of the grating, the reflecting surface could be an internal surface of the cursor and the cursor may be tilted in relation to the plane of the grating to cause the strip of light to fall on the displaced parts of the various sensitive surfaces.

The individual adjusters conveniently comprise adjustable stops for controlling the light falling on the displaced parts of the surfaces from the source of light.

The head will normally comprise a light tight housing so that the adjusters are independent of the level of ambient light. There may be a separate adjuster for each detector for adjusting the individual outputs when the detector are fully illuminated from the grating so that the maximum illumination can be the same for each detector.

An advantage of the invention is that the minimum light levels, or dark levels, for the cells can be set to be equal without interfering with the area of sensitive surface illuminated by the grating.

The invention may be carried into practice in various ways and one embodiment will now be described by way of example with reference to the accompanying drawings, in which.

Figure 1:
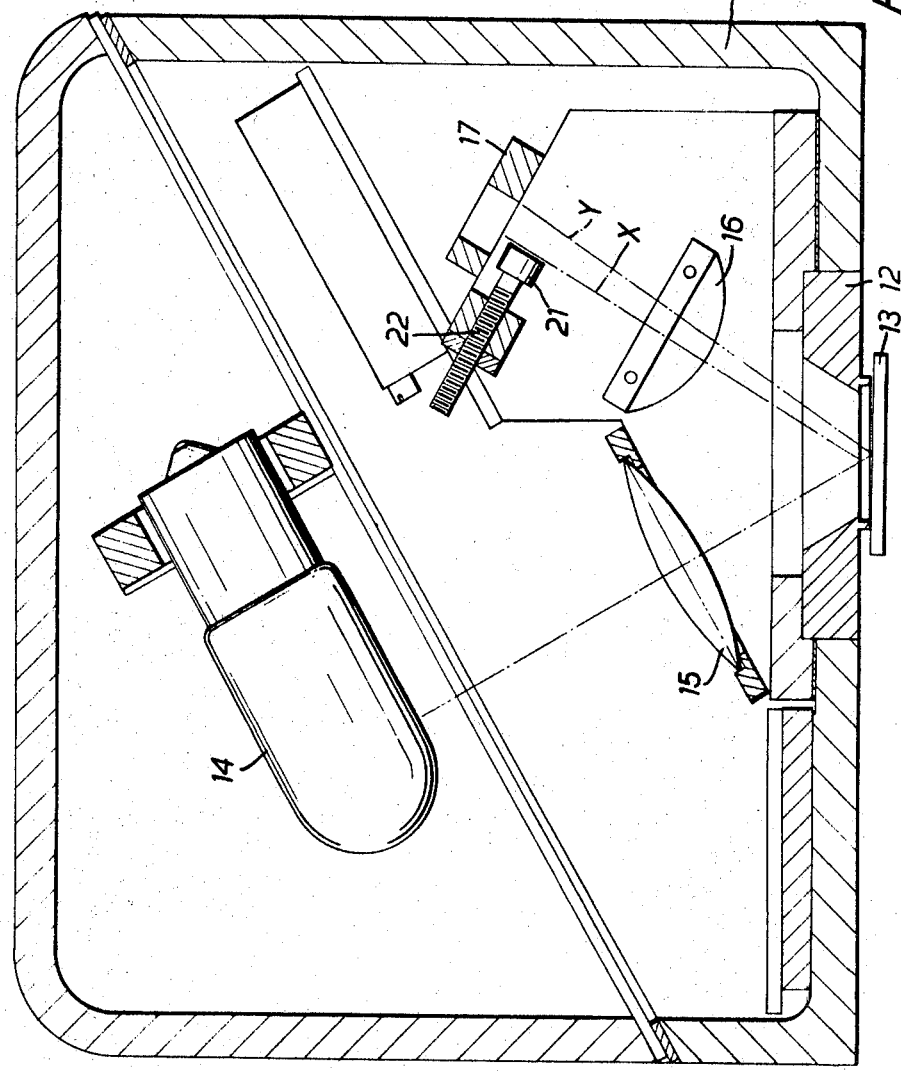
FIG. 1 is a section through a reading head embodying the invention.

The head comprises a light tight housing 11 carrying a cursor 12 capable of moving with the housing over a grating 13 along the length of the grating, which is perpendicular to the plane of FIG. 1.

The grating 13 is ruled with alternate dark lines and reflecting spaces, and light from the single lamp 14 in the light tight housing 11 is focused by a lens 15 on to the upper surface of the grating whence it is reflected through collimating means 16 on to the photosensitive surfaces of four photosensitive detectors indicated generally at 17. Each detector 'looks' at a different portion of the grating 13, the portions being defined by four pairs of apertures 18 in the cursor 12, each pair corresponding to two lines of the grating, the different apertures being phase displaced in relation to the grating as described in more detail in U.S. Pat. Specification No. 3,122,686.

When the two slots comprising one pair of apertures 18 (FIG. 2) are over lines in the grating, the corresponding photocell 17 will receive minimum illumination but when the slots are over the spaces between lines in the grating, the cell will receive maximum illumination, and it is important that the minimum and maximum, or dark and light, currents from the four detectors shall be balanced.

Figure 2:
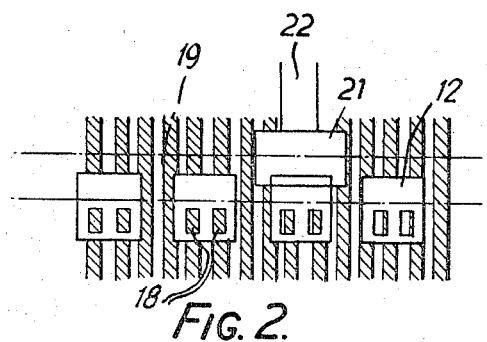
FIG. 2 shows diagrammatically the photosensitive areas of the four photosensitive detectors in the head of FIG. 1.

In accordance with the invention the cursor 12 is tilted a little from the plane of the grating 13 so that light from the lamp 14 is reflected from its upper surface as shown at X on to the four sensitive surfaces of the detectors 17 in a light band shown generally at 19 in FIG. 2. This band covers a part of the photosensitive surfaces displaced from the part where the images of the apertures 18 modulated by the grating appear as shown in FIG. 2 and at Y in FIG. 1. The angle of tilt may be about 1°.

Each detector 17 has its individual opaque stop 21 carried on the end of an adjusting screw 22 and controlling the amount of light from the band 19 which falls on the sensitive area of the detector, so that the detectors can be individually adjusted until the dark currents when the apertures are over lines in the grating are the same for all detectors.

The light currents, when the apertures are over the reflecting spaces in the grating, can be adjusted to be the same for all four detectors 17 by electrical means in the output circuits from the photocells.

It is clear that a change in the brightness of the lamp 14 will affect all the minima and maxima settings of the detectors equally so that the position information contained in the output signal will be independent of such variations and could also be independent of the replacement of a lamp.

Moreover, the minima adjustments are achieved without interfering with the area of the sensitive surface upon which light through the cursor apertures falls and this gives the head a controllable range of modulation between light and dark to give higher resolutions. Moreover, by appropriate positioning of the band of reflected and modulated light, the images from the grating through the cursor apertures can be permitted to wander a little without affecting the balance settings.

Figure 3:
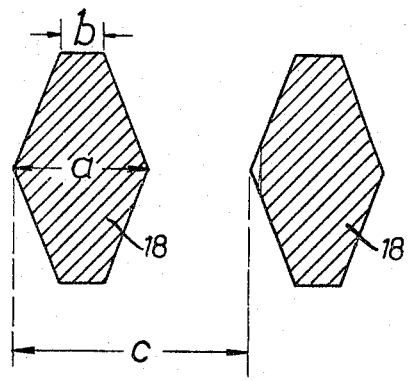
FIG. 3 shows one arrangement of apertures for spacial modulation of light for the detectors.

One arrangement of the two apertures 18 in the cursor 12 for each detector 17 is shown in FIG. 3.

The two apertures 18 are spaced apart with a pitch $c$ equal to 9/10 (or 11/10) $\times 2a$ where $2a$ is the pitch of the lines in the grating. The width of each aperture is conveniently equal to $a$, i.e. half the grating pitch.

This spacing of the apertures 18 helps to eliminate fifth harmonic components in the signal from the detectors 17, since the fifth harmonic contributions from the two apertures will be half a period out of phase with each other. The output will thus more closely approximate to the sine of the fundamental frequency.

The apertures could be rectangular with a width equal to one-third of a grating pitch to cancel out the third harmonic component and with the same aperture pitch $c = 9/10 \times 2a$ or $11/10 \times 2a$ to cancel out the fifth harmonic component.

However the double trapezoidal aperture of FIG. 3 has the advantage that the fifth harmonic component can be canceled out as described above, and also the advantage that the seventh harmonic component has an amplitude of only 0.8 percent of the fundamental.

This figure 0.8 percent is achieved with a grating pitch of $2a$ lines of the grating is rectangular with a width $a$ and if the ratio $a:b$ is equal to 3:1.

Alternatively, it would be possible to cancel out the seventh harmonic by having the apertures spaced apart with a pitch of 13/14 or 15/14 of a grating pitch, but another possibility is to have two pairs of apertures for each detector 17, the apertures of each pair being spaced with a pitch of 9/10 or 11/10 the grating pitch, while the pairs are spaced apart with a "pair pitch" of 13/14 or 15/14 of a grating pitch.

I claim:

1. A reading head for detecting a modulated image including a number of photosensitive detectors each arranged to receive a modulated image and comprising a source of unmodulated light in the head arranged to illuminate a part of the sensitive surface of each detector displaced from the part where the modulated image appears and an individual adjuster for each detector to control only the unmodulated light falling on the displaced part of the sensitive surface and not the light forming the modulated image.

2. A reading head as claimed in claim 1 in which each detector is arranged to receive the image from a different section of an optical grating.

3. A reading head as claimed in claim 2 including means for determining a combined output signal from the instantaneous outputs from the various detectors.

4. A reading head as claimed in claim 2 in which a reflecting surface is arranged to reflect on to the displaced parts of the sensitive surfaces to the detectors unmodulated light from a lamp which is also used to illuminate the grating.

5. A reading head as claimed in claim 4 including a cursor having light-transmitting apertures between the sensitive detectors and parts of the grating and in which the reflecting surface is an internal surface of the cursor.

6. A reading head as claimed in claim 5 in which the cursor is tilted in relation to the plane of the grating.

7. A reading head as claimed in claim 1 in which the individual adjusters comprise adjustable stops for controlling the light falling upon the displaced parts of the surfaces from the source of light.

8. A reading head as claimed in claim 1 comprising a light tight housing for the detectors and the source of light.

9. A reading head as claimed in claim 1 including a separate adjuster for each detector for adjusting the individual outputs when the detectors are fully illuminated.